Feb. 19, 1935.   P. J. JORGENSEN ET AL   1,991,392
THERMOSTATIC VALVE
Filed Nov. 21, 1931   3 Sheets-Sheet 2
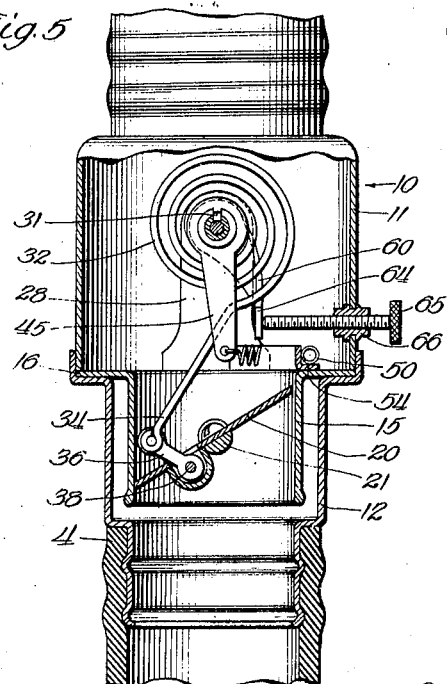
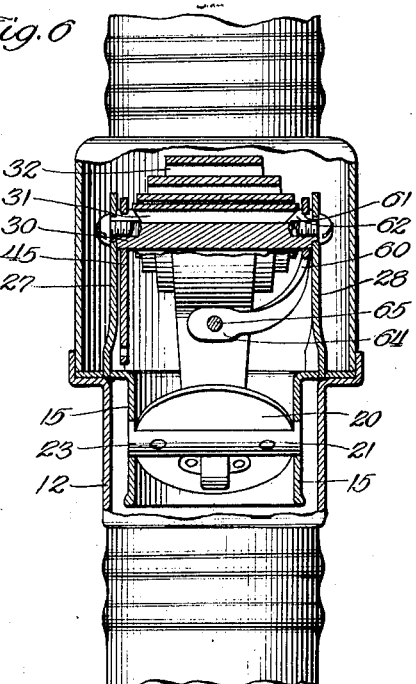
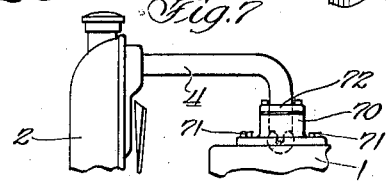
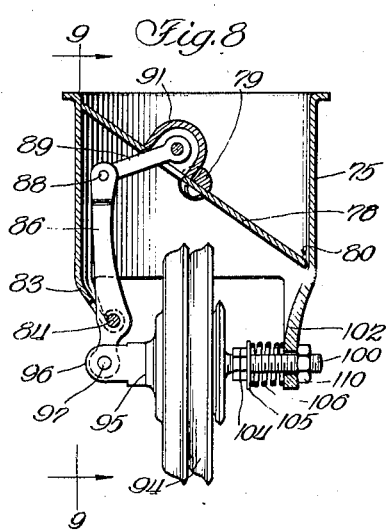
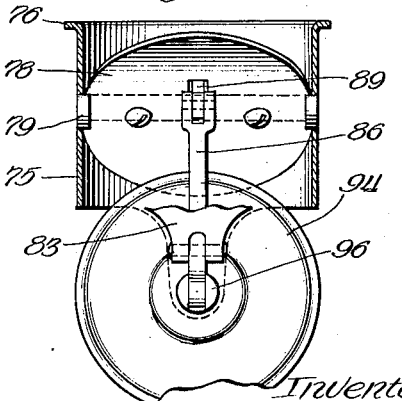
Inventors:
Peter J. Jorgensen
Clarence H. Jorgensen
By Brown, Jackson, Boettcher & Dienner
attys.

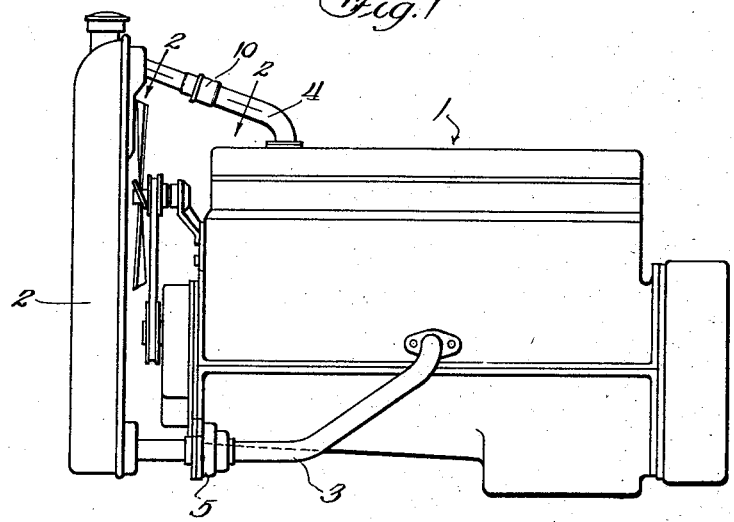
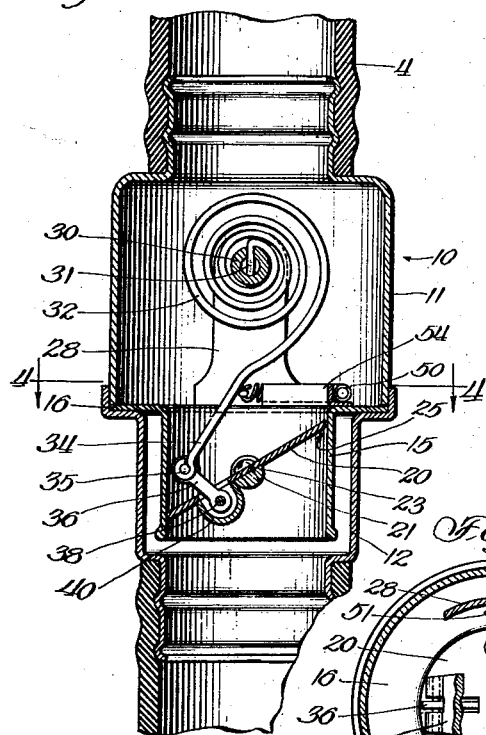
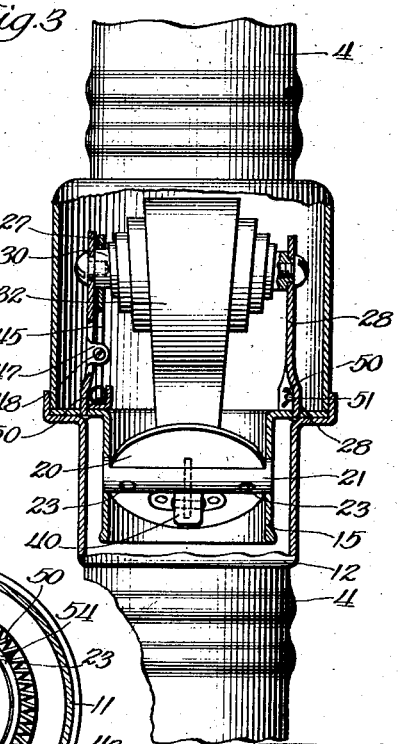
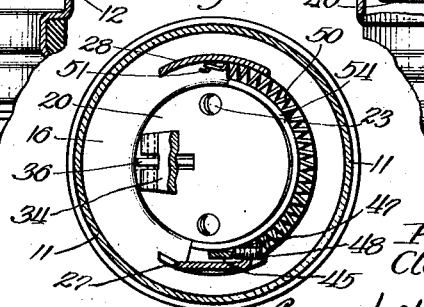

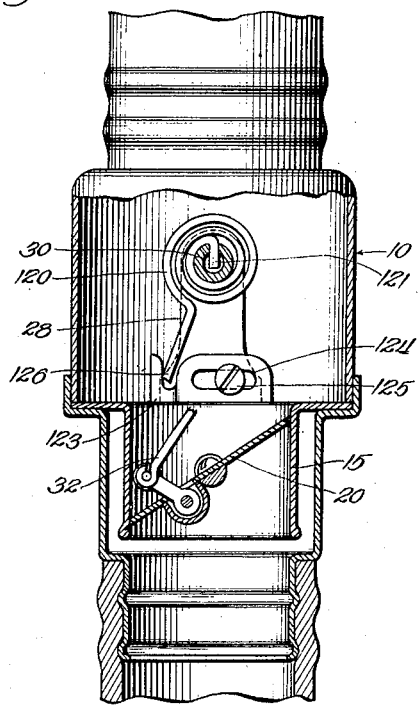
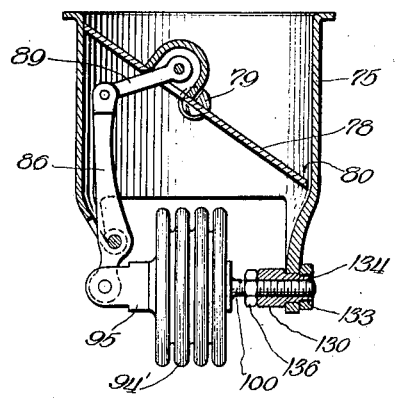
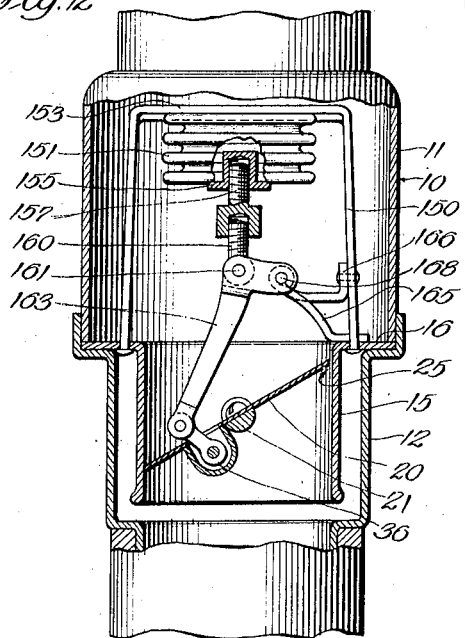
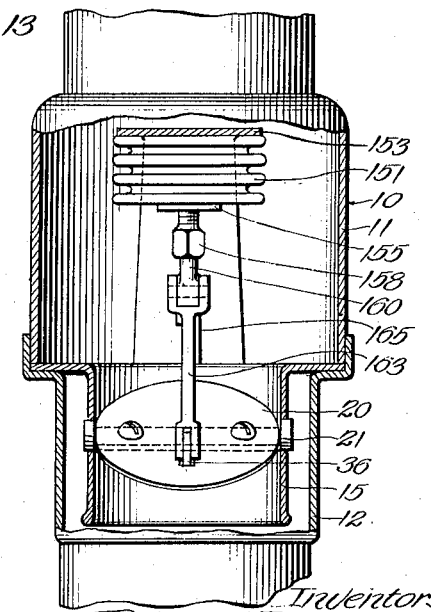

Patented Feb. 19, 1935

1,991,392

UNITED STATES PATENT OFFICE 1,991,392

THERMOSTATIC VALVE

Peter J. Jorgensen and Clarence H. Jorgensen, Oak Park, Ill.; Clarence H. Jorgensen administrator of estate of said Peter J. Jorgensen, deceased Application November 21, 1931, Serial No. 576,526

REISSUED

11 Claims. (Cl. 236—34)

The present invention relates generally to temperature responsive control systems and is particularly concerned with the provision of a new and improved thermostatic valve especially useful in connection with controlling the cooling apparatus of an internal combustion engine or similar device but may be advantageously employed in any system having thermostatically controlled parts.

When internal combustion engines are used, particularly in cold weather, it is extremely desirable to have the engine warm up as soon as possible in order that the lubricant will flow to the various surfaces in frictional contact and so that the fuel can be economically burned and as much power as possible be secured therefrom. This is especially true in the case of internal combustion engines for automotive vehicles and the like. Generally internal combustion engines are cooled by circulating water around the cylinders and passing the water through suitable radiators and the like for extracting the heat therefrom. While such cooling systems are necessary after the engine has become warmed up and is operating under power it is nevertheless true that such cooling systems normally tend to prevent the motor from initially warming up to operating temperature as quickly as would otherwise be the case.

Various attempts have been made to combine these two features, namely, a cooling system for keeping the temperature of internal combustion engines down during operation and means to prevent the cooling system from operating to cool the motor until it has initially reached the desired operating temperature. Generally such devices include a controlled restriction or valve shutting off circulation through the cooling system until the engine has become sufficiently warm. As one example of such a construction which has been generally successful, reference may be had to the patent to Peter J. Jorgensen and Clarence H. Jorgensen, No. 1,745,622, dated February 4, 1930. In this case the valve controlling the operation of the cooling apparatus was itself controlled by temperature responsive means so that the cooling apparatus did not function as such until the temperature of the cooling liquid reached a certain desired amount. Thereupon the valve would be shifted to permit normal circulation of the cooling liquid and the normal operation of the cooling apparatus as a whole. Where the cooling system employs a pump for forcing a circulation of the cooling medium the pump exerts a considerable pressure against the valve when closed so that when the valve is to be opened considerable static friction in the bearings of the valve must be overcome before the valve will be moved. At the point when the thermal element is beginning its opening movement, however, it can exert only limited power, and the above identified patent disclosed one means for securing a definite and accurate opening movement of the valve controlled by the relatively weak thermal responsive element by holding the valve closed until the thermal element can exert sufficient power to properly control the valve.

The present invention, therefore, is in the nature of an improvement upon such devices as those illustrated in the patent above identified. Particularly, the present invention has for its principal object the provision of a temperature responsive control system for internal combustion engines in which a substantially balanced valve is employed and the temperature at which the valve opens to place the cooling apparatus into operation can be definitely ascertained and controlled. It is recognized that internal combustion motors operate best at comparatively high temperatures, but in prior control devices it was necessary to so design the apparatus that the valve would open at a comparatively lower temperature than would otherwise be desirable in order to provide for situations in which the opening of the valve might be delayed for various reasons, such as excessive pump pressures and the like, in which case the motor would become overheated before the valve would open to permit the normal operation of the cooling system. The present invention provides an apparatus in which the temperature at which the valve opens can be quite definitely determined and controlled, hence the opening of the valve can be set so that the temperature of the motor can become materially higher than heretofore possible before the cooling circulation is established, yet without any danger of overheating the motor because the thermostatically controlled valve of the present invention can be relied upon to open practically exactly at the temperature set.

Generally when the motor or other device gradually attains its proper temperature, particularly in cold weather, only a small amount of valve opening will suffice for a considerable time. If the valve were thrown wide open at this time its temperature would immediately fall below the desired point. Under these conditions, therefore, it is desirable to definitely and positively control the initial opening of the valve. By employing a substantially balanced valve in connection with a thermal element which is initially tensioned to hold the valve closed, desired positive control is secured, both by suitable adjustment of the tension and by the utilization of a slight but definite amount of overbalance in favor of valve opening modified by flow means tending to maintain the valve closed. The balanced valve preferably employed is comprised of a relatively thin flexible disc which is formed so that when closed there is some flexing under variations of pump pressure. This flexing, particularly where the valve is slightly overbalanced in favor of opening, serves to overcome the static friction in the bearings mentioned above and materially aids the thermal element in shifting the valve to the proper position.

It is also an important feature of the present invention to provide an improved construction whereby the temperature at which the valve opens can be adjusted without involving any disturbance of any of the operating linkage or equivalent structure. Heretofore, adjustments have been attempted but generally such adjustments were secured through various means in which the linkage between the thermal responsive member and the valve was shortened or lengthened or otherwise shifted. When it is remembered that the range of movement of a temperature responsive element is rather small and that this movement must be multiplied it will be seen that any adjustment or rearrangement of this linkage is likely to throw the linkage in such a position that the same will not operate properly. This arises because of the relatively short lever arms which are generally employed to secure the proper multiplication. The present invention contemplates adjusting the end or portion of the temperature responsive element opposite that portion which operates the valve or a valve linkage. No adjustment of the linkage is attempted whatsoever and in this feature I attach considerable importance to the present invention.

Another feature of importance in the present invention is that a novel structure is provided for taking the reaction of the temperature responsive element which includes a yielding part. Should the temperature responsive element be subjected to such a temperature change that the corresponding change in the position thereof would otherwise distort or wreck the valve or the valve linkage, the yielding part or parts shift, thereby protecting the mechanism and limiting the force which the temperature responsive element can exert upon the valve or other control member. The construction of the present invention is so arranged, however, that after the causes producing the excessive temperatures have been removed the parts return to their normal position and no subsequent adjustment of any kind is required to bring the parts into proper relation. In this respect, therefore, the present device is entirely automatic and functions without any supervision whatsoever to protect the mechanism from excessive temperatures.

Another object of the present invention is the utilization of a fluid filled bellows as the thermal or temperature responsive element, in connection with a butterfly valve or any other valve of the substantially balanced type. It is old to employ fluid filled bellows as the thermal element in connection with poppet valves and the like, but where these parts were disposed in cooling systems employing a pump as the circulating means it was necessary to provide a bellows of considerable diameter, specifically a diameter comparable to the diameter of the poppet, so that the force of the hydrostatic pressure tending to open the valve would be approximately equal to the force on the bellows tending to hold the valve closed, or vice versa. If these areas were not about the same it was found that the poppet valve would tend to open under pump pressures. With the use, however, of a valve of the butterfly type, that is, one which is substantially balanced, no great amount of force is exerted by the pump tending to open the valve and hence a large bellows need not be employed. As pointed out above, however, it is frequently desirable to employ a butterfly valve which is slightly overbalanced in favor of opening and in this case where a bellows is employed as the thermal element, a relatively inexpensive bellows having a small diameter suffices. Furthermore, by utilizing a butterfly type of valve the extent of movement of the bellows need be very little as compared with the extent of movement of the bellows connected with a poppet valve, since a poppet valve must be moved a considerable distance away from the opening it closes before a full flow may be had through the opening. On the other hand, by the use of a butterfly valve pivoted centrally in the conduit and by using a short lever arm the butterfly valve may be swung from open to closed position and vice versa by only a small movement of the bellows. As a result, therefore, of the use of these particular elements a large relatively expensive bellows having many convolutions is unnecessary, since a small bellows suffices in this construction, yet the forces are so balanced that the butterfly valve is definitely and positively controlled by the thermal element.

These and other objects of the present invention will be apparent to those skilled in the art after a consideration of the following detailed description of preferred structural details, taken in conjunction with the accompanying drawings in which:

Figure 1 is a view showing the present invention as applied to the upper connection between the radiator and the internal combustion engine of an automobile;

Figure 2 is a longitudinal sectional view through my improved thermostatic valve and showing fragments of the associated radiator hose connections;

Figure 3 is a view taken at right angles to the section shown in Figure 2 and showing some parts in elevation and some parts in section;

Figure 4 is a sectional view taken on the line 4—4 of Figure 2 and looking in the direction of the arrows;

Figure 5 is a view corresponding to Figure 2 but illustrating the application of manual adjusting means for adjusting the device to increase or decrease the temperature at which the valve begins to open;

Figure 6 is a view taken at right angles to the view shown in Figure 5 and showing particularly the curved arm by which the tail end of the aperture responsive element is adjusted;

Figures 7, 8 and 9 illustrate a modified form of the present invention embodying a fluid filled bellows, Figure 7 illustrating the installation of the device on an automobile motor and Figure 9 being a view taken along the line 9—9 of Figure 8 which is a cross section through the device;

Figure 10 is a view similar to Figures 2 and 5 and illustrating a slightly different form of reaction or abutment spring;

Figure 11 is a modified form of thermostatic device which is similar to that shown in Figure 8 and which employs the adjustment feature there shown but without the yielding abutment; and Figures 12 and 13 illustrate a slightly different form of fluid filled bellows type of thermostatic device.

Referring now more particularly to the form of the present invention shown in Figures 1 to 4, the reference numeral 1 indicates an internal combustion engine of conventional construction. When used in automobiles the engine 1 is provided with a cooling radiator 2 having connections 3 and 4 with the water jacket of the internal combustion engine 1. Usually a pump, such as the one indicated by the reference numeral 5, is provided for circulating the water through the water jacket of the motor and to the cooling radiator 2, the pump drawing water from the bottom of the radiator and circulating the same through the water jacket of the motor 1 and forcing the same through the hose connection 4 to the top of the radiator 2. In some cases thermo-siphon circulation is relied upon and no pump is necessary. The present invention operates equally with either pump circulation or thermo-siphon circulation.

My improved device shown in Figure 1 is preferably installed in the upper hose connection 4, and comprises a casing 10 formed of two parts 11 and 12 suitably connected together in any desired manner. Each casing part includes a reduced end to receive the sections of the upper hose connection 4.

A cylindrical shell 15 is suitably mounted within the casing 10, preferably axially thereof, and the shell 15 includes flanges 16 by which the shell may be secured in place. A control member or valve 20 of the balanced butterfly type is suitably pivoted within the shell 15, as by a trunnion 21 having the ends thereof received within bearings formed in substantially diametrically opposite portions of the shell 15. Preferably, the valve body, which is in the form of a relatively thin flexible disc, is secured to the trunnion 21 by a pair of screws 23.

The control member or valve 20 is movable between open and closed positions, and as best shown in Figure 2 the valve is so dimensioned as to be disposed in an oblique position when closed and obstructing the flow of the cooling medium through the casing 10. The valve 20 is so shaped however that there are approximately equal areas on opposite sides of the axis of its trunnion 21 although as will be explained later a slight unbalanced condition of the valve 20 is desirable in many cases. Nevertheless the butterfly valve is inherently or substantially balanced as compared to poppet valves and others. The valve 20 or the shell 15 or both are also so formed that there is a small clearance between one edge and the adjacent interior surface of the shell 15, even when the valve 20 is normally closed, as indicated in Figure 2 by the reference numeral 25. Not only does the small flow passing through the clearance 25 set up forces aiding the temperature responsive element in maintaining the valve 20 closed until the desired temperature is reached, as pointed out in the patent above identified, but also the clearance 25 provides a construction in which the pressure of the pump tends to bend the flexible disc on both sides of the axis of the trunnion 21. This flexing, which varies with pump pressure, causes a very small more or less continued movement of the trunnion which overcomes the static friction at this point. The greater the pump pressure the greater will be the static friction or bearing load on the trunnion but, at the same time, the greater and more positive will be the flexing, thus rendering the valve 20 much easier to control, as will be explained in detail later. Another advantage of having a thin disc is that there will be less likelihood of dirt and grit lodging between the valve and the shell 16.

A pair of brackets 27 and 28 are suitably secured to the flange 16 of the shell 15. As shown in Figure 3, these brackets 27 and 28 are separately formed and riveted to the shell 15, but it will be apparent that where desirable these brackets may be formed integrally with the shell 15. The brackets 27 and 28 are suitably spaced apart and have their outer ends apertured to receive an abutment member 30 therebetween. Preferably, the abutment member 30 is pivotally mounted upon the brackets 27 and 28. The abutment 30 is suitably slotted to receive the tail end 31 of a temperature responsive coil 32, the outer end 34 of the temperature responsive element 32 being formed to receive a pivot pin 35 by which a link 36 is pivotally secured thereto at one end. The other end of the link 36 is pivoted to the valve 20 in any desired manner, as by a pivot pin 38 and a suitable bracket 40 carried by the valve 20.

The position of the movable abutment member 30 is controlled by an arm 45 which is rigidly secured to the member 30 and which extends alongside the bracket 27, as best shown in Figure 3. The bracket 27 includes an ear 47 suitably bent to a position approximately at right angles to the plane of the bracket 27 and which is also apertured and threaded to receive an adjusting screw 48. As best shown in Figure 4, the adjusting screw 48 cooperates with the arm 45 to limit the movement thereof in one direction, namely, to the right in Figure 4 and upwardly in Figure 3.

The movement of the arm 45 in the other direction is yieldingly resisted by a spring 50 anchored to the other bracket 28, as at 51, and guided and held in place by an arcuate angle bar 54. The purpose of the member 54 is to provide for the use of a relatively long spring and to hold the same in a position which will not interfere with the flow of the cooling medium through the casing 11 and the shell 15.

The operation of a device described above is substantially as follows. Initially, the temperature responsive coil 32, which may be formed of two dissimilar metal strips suitably secured together or the equivalent thereof, is tensioned to hold the valve 20 closed with a spring pressure at all temperatures below that at which it is desired that circulation be established through the radiator 2. Obviously, this may be accomplished by giving the arm 45 one or more turns in the proper direction after the end 34 of the temperature responsive element 32 has been link connected with the valve 20. The temperature responsive element 32 therefore exerts a force biasing the valve 20 to closed position. This force holding the valve 20 closed is aided by the leak flow through the restricted opening 25 at one edge of the valve 20. The valve 20 is substantially balanced, that is, has substantially equal areas on opposite sides of its pivot axis, but in systems employing a circulating pump or the like the pressure on the valve bearings when the valve is closed may be considerable and where the thermal element has relatively small power the valve preferably is slightly pivoted off center sufficient to give it a tendency to open under the pump pressure so as to aid the element in controlling the position of the valve, particularly where a small controlled flow with the valve held opened only a small amount suffices to maintain the motor at the desired temperature, which is a condition met with in cold weather.

When closed there is considerable pressure exerted against the valve 20 which gives rise to a substantial bearing friction which requires a substantial force to overcome in first shifting the valve. As best shown in Figure 2, the left hand portion of the valve disc abuts against the wall of the shell 15 while by virtue of the clearance 25 at the other side of the valve the hydrostatic pressure acting on the valve will tend to spring the valve disc tightly against the shell and entirely close off the clearance opening. This introduces a flexing of the valve disc which occasions a minute but positive rotation of the trunnion 21 which serves to break the static friction. The amount of flexing varies with the pump pressure which itself varies with the speed of the motor and, since the latter continually varies, the valve 20 is maintained in what we term an active or floating condition.

The overbalance referred to above is however slight so that the initial tension of the thermal element is sufficient to hold the valve 20 closed until the temperature has exceeded a given range. The constant but small movements of the valve 20 on its pivot overcomes static friction in the bearings and renders the valve subject to control by the relatively weak thermal element. It will thus be apparent that the initial tension imparted to the coil 32 will determine very accurately at just what temperature the valve 20 begins to open. The greater the tension exerted by the coil 32 in holding the valve 20 closed at low temperatures the higher will be the temperature at which the valve 20 begins to open. Once the valve 20 has been opened against the hydrostatic pressure of the pump the pressure falls and bearing friction is immediately lowered, hence the valve 20 can be accurately controlled.

As a means for adjusting the tension of the thermal element 32 after the device has been assembled or after it has been installed, the arm 45 and the adjusting screw 48 have been provided The adjusting screw 48 acts as an abutment against which the initial tension in the temperature coil 32 can react to hold the valve closed. Referring to Figure 4, if the adjusting screw 48 is threaded farther into the ear 47, thereby moving the arm 45 to the left, the pull of the temperature coil 32 in the valve closing direction will be increased and the valve 20 will be held closed with a greater force, thereby elevating the temperature at which the valve 20 will begin to open. In this way, the inherent resiliency of the temperature coil 32 is relied upon to hold the valve 20 closed until a given temperature has been reached. Obviously, other means may be provided for the same purpose, and generically the inherent resiliency of the temperature coil 32 is the equivalent of any means which counteracts or opposes the forces set up in the temperature responsive element by an increasing temperature. For example, where the temperature responsive element 32 is initially tensioned internal stresses are set up which must be counteracted by equal but opposite forces set up by the heating of the coil 32 before any movement whatsoever of the outer end 34 of the coil will occur. After this critical temperature has been reached the forces initially established are overcome and the forces due to the expansion of the temperature coil 32 will then be available to swing the valve 20 open. It will be apparent from the description, therefore, that separate spring means may be provided, if desired, to oppose the initial movement of the coil 32 in heating up to the critical temperature at which it is desired that the valve shall begin to open.

As described above, means are also provided for limiting the force which the temperature coil 32 can exert upon the valve 20 after the coil has been heated beyond the critical temperature referred to in the preceding paragraphs. This means is in the form of a yielding abutment so that when the coil 32 has been heated beyond the point where the valve 20 has been moved to its maximum position, which is the position in which one side of the valve 20 strikes the outer end of the temperature coil 32, further expansion of the temperature coil 32 is resisted only by the spring 50 which acts to hold the arm 45 against the adjusting screw 48. During these periods of excessive high temperature the spring 50 yields to permit the arm 45 to swing away from the abutment 48, thereby protecting the valve and associated parts. Since the spring 50 is comparatively long the temperature coil 32 can be subjected to exceedingly high temperature without damaging any of the parts of my device. As a matter of fact, spring means much shorter than that indicated by the reference numeral 50 may be successfully employed.

Figures 5 and 6 illustrate a construction which is identical with that shown in Figures 2 and 3 with the exception that where the adjusting screw 48 must be adjusted before the device is assembled within the casing 11, the form shown in Figures 5 and 6 employ an adjusting means which is accessible from without the casing. This is an important feature in that it is frequently desirable to adjust my thermostatic valve structure for different driving conditions. For example, the temperature at which the valve 20 is open should be lower during the winter months than during the summer months, not only to prevent boiling out any of the anti-freeze solutions which may be applied, such as alcohol and the like, but also to provide for a somewhat greater flow of cooling medium since it is well known that such substances as alcohol, glycerine and the like are less efficient as cooling mediums than water. By having the adjustment accessible from without the casing different driving conditions may thus be provided for. Such adjustment may be manual or may itself be thermostatically effected.

In the form shown in Figures 5 and 6, the ear 47 and the adjusting screw 48 on the bracket 27, as shown in Figure 3, have been dispensed with. Instead, the pivoted abutment member 30 is provided with a curved arm 60 one end of which is fixedly secured to the member 30, as by a tongue 61 seated in a slot formed in the member 30 and in which the inner end 31 of the temperature responsive coil is received. This is the same construction by which the arm 45 shown in Figure 3 is fixedly secured to the member 30. The other end of the curved arm 60 is provided with a flat portion 64 which is arranged underneath a long threaded adjusting screw 65 threaded through a bushing 66 carried by the casing part 11, as best shown in Figure 5. Tightening or loosening the adjusting screw 65 swings the arm 60 to increase or decrease the tension exerted by the temperature responsive coil 32 tending to hold the valve 20 closed. By virtue of the curved arm member the threaded adjusting screw 65 can be positioned in the center of the casing 11, but obviously this is not absolutely necessary and the adjusting screw 65 can be positioned to one side of the central plane and cooperate with a straight arm such as 45.

Figures 7, 8, and 9 illustrate a construction embodying a fluid filled extensible bellows as the temperature responsive element rather than a coil such as is illustrated in Figures 2, 3, 5, and 6. As best shown in Figure 7, the thermostatic valve is located between the engine block and the upper radiator connection 4 and includes a flanged housing 70 suitably secured as by cap screws 71 and provided with a clamping ring 72. Between the ring 72 and the housing 70 the casing 75 of the bellows type of temperature responsive device is secured. The casing or shell 75 is of generally cylindrical formation and includes a flange portion 76 adapted to be received between the clamping ring 72 and the housing 70. A pivoted relatively flexible valve 78 is swingably mounted within the shell 75 and is adapted to control the flow of cooling medium through the shell 75 in the same manner that the valve 20 described above operates. A trunnion 79 is provided for the valve 78 and is identical, for all practical purposes, with the trunnion 21 illustrated in Figures 2 and 3. A restricted opening, indicated by the reference numeral 80, is provided to allow for flexing under pressure variations, as described above. The valve 78, like the valve 20, may if desired be given a slight overbalance for the purpose of utilizing the pump pressure to aid the opening of the valve against the static friction of the joints and bearings.

The shell 75 is provided with a bracket 83 which is bifurcated as best shown in Figure 9. This bracket is formed to receive a pivot pin 84 by which a lever 86 is fulcrumed on the shell or casing 75. One end of the lever 86 is bifurcated to receive a pivot pin 88 and a link 89, the other end of the latter being pivotally connected with a bracket 91 secured to the valve 78 and which is similar to the bracket 40 shown in Figures 2 and 3. The other end of the lever 86 is connected with one end of the expansible bellows 94 and the bellows 94 carries a stud 95 at one end which is provided with a pair of ears 96 which are apertured to receive a pivot pin 97 by which the lever 86 is operatively connected with the bellows 94.

The other end of the bellows is provided with a threaded stem 100 which projects through a suitably formed opening in a second bracket 102 carried by the shell 75. A pair of lock nuts 104 serves, in connection with a washer 105, as a fixed abutment on the stem 100. A spring 106 is interposed between the washer 105 and the bracket 102, and this spring is adapted to yield when the bellows 94 is subjected to abnormally high temperatures, just as the spring 50 is arranged to yield in the constructions illustrated in Figures 2, 3, 5, and 6.

An adjusting nut 110 is threaded onto the outer end of the stem 100 and this member cooperates with the bracket 102 to initially tension the temperature responsive bellows 94 to hold the valve 78 closed until a predetermined temperature has been attained, just as the adjusting screw 48 and the adjusting screw 65 adjust the tension of the temperature responsive coil 32 described above.

While Figure 8 shows an adjusting member 110 in the form of a nut it is obviously possible to extend the member 110 to a point outside the housing 70 in which case the temperature at which the thermal responsive member 94 becomes active to open the valve 78 can be easily adjusted after the device has been installed.

The expansible bellows 94 is preferably filled with a fluid such as alcohol under vacuum so that the vapor pressure of the fluid in the bellows constitutes the material responsive to changes in temperature which causes the bellows to expand and contract with such changes. The provision of the bellows 94 on the upstream side of the valve 78 positions the former so as to be subjected to the pump pressure which therefore acts to positively hold the valve closed at all temperatures below that at which the vapor pressure of the contained alcohol is greater than is developed by the pump. In addition, of course, atmospheric pressure also acts on the bellows to aid in maintaining the valve 78 closed. Where in the previously described modification the inherent resiliency of the temperature coil was relied upon to hold the valve closed at low temperatures, the thermal responsive member 94 utilizes atmospheric pressure and hydrostatic pressure for holding the valve 78 closed.

In automobile motors the hydrostatic head at the valve due to the operation of the pump may vary as much as from five to fifty pounds. Such variations introduce corresponding variations in the bearing loads imposed on the trunnion of the valve, and even where the valve 78 is slightly overbalanced in favor of opening so that with a sudden increase in speed of the motor, which increases the pressure against the valve 78, there is a greater increase of the force tending to open the valve, yet the corresponding increase in bearing friction at the same time holds the valve closed. However, where the valve 78 is arranged to flex, which is preferable, as in the case of valve 20 of Figure 2, the static friction of the bearings may be overcome to such an extent that a sudden increase in pressure may open the valve. By providing an expansible bellows these variations are, in effect, compensated since the same variations of pressure on the pivoted valve are exactly the same variations to which the bellows or temperature responsive element is itself subjected. Hence, in my construction if there is an increase of pressure on the valve tending to open it there is also a corresponding increase in the pressure on the bellows tending to hold the valve closed. These variations of pressure are, of course, still available to free the valve 78 of static friction and maintain the same active. The thermal responsive element although capable of exerting only a limited force is nevertheless operative to bring the pivoted valve to just the right position to permit the proper flow of the cooling medium.

Since the adjusting member 110 serves to increase or decrease the volume of the bellows 94 it serves to thereby raise or lower the temperature at which the expansion of the thermal fluid begins to act to open the valve under the influence of temperature changes. The member 110 also serves to vary the effectiveness of the hydrostatic pressure in the casing in holding the valve 78 closed.

The spring 106 acts as a yielding abutment to permit excessive expansion of the bellows 94 under abnormal temperature conditions from damaging any of the operating parts. When the bellows 94 has expanded sufficiently to cause the lever 86 to swing the valve 78 until the latter strikes the bellows any further expansion of the latter will then react against the spring 106 and cause the same to yield, the stem 100 merely shifting in the bracket 102 to the right as viewed in Figure 8.

The modification illustrated in Figure 10 shows a different form of reaction spring than is shown at 50 in Figures 2, 4 and 5. In these figures the spring 50 while providing a suitable yielding abutment is such as to limit the swinging of the arm 45 under excessive temperatures to an angle considerably less than one complete revolution. This limitation does not exist in the structure shown in Figure 10 in which the abutment member or shaft 30, journaled in brackets 27 and 28, is provided with a coil spring 120 having its inner end 121 received within the same slot 62 as the one shown in Figures 2 and 6 as receiving the inner end of the temperature responsive coil 32. The outer end of the reaction spring 120 is received by an adjustable stop 123. The stop 123 is provided with a slot 124, and a screw 125 is received by this slot and is threaded into the bracket 28 to adjustably secure the stop member 123 in place. The purpose of the stop member is to adjust the tension capable of being exerted by the spring 120 and also to provide for certain manufacturing tolerances in which the inner and outer ends 121 and 126 of the spring 120 may not always occupy exactly the same angular relation.

In this form, as in the forms shown in Figures 2 and 5, when the thermal responsive member 32 is subjected to excessive temperatures and expands to an extent sufficient to swing the valve 20 against the thermal element any further expansion of this element reacts through the pivoted abutment 30 against the spring 120. When this spring is a coil spring, as shown in Figure 10, the temperature coil may withstand such high temperatures as would cause the same to unwind to rotate the member 30 one or more revolutions without occasioning any damage to the reaction spring 120 or other associated parts. The spring 50 is not adapted to take care of such excessive temperatures and, as a matter of fact, they rarely occur.

Figure 11 illustrates an embodiment of the present invention similar to that illustrated in Figure 8 but which dispenses with the yielding abutment provided by the spring 106 in Figure 8. In the case of Figure 11, the stem 100 is threaded into an adjusting sleeve 130 which is provided with a polygonal head 133 securely fastened thereto. Preferably the sleeve 130 is provided with a reduced end 134 receiving the head 133. Rotation of the head 133 serves to rotate the sleeve 130 and hence serves to adjust the tension exerted by the bellows 94 on the pivoted valve 78 at low temperatures. If desired, a lock nut 136 may be provided to lock the adjusting sleeve 130 in proper position. In the form shown in Figure 11, as well as in Figure 8, the adjustment may be carried to the outside of the casing or housing 70 in which case the thermostat device can be readily adjusted after the same has been installed.

Figure 11 also illustrates the use of a relatively small bellows in connection with a substantially balanced valve of the pivoted butterfly type. While, in Figures 8 and 9, for purposes of clarity, the bellows 94 is shown as being of substantial diameter, such a large bellows is not essential and a much smaller and more inexpensive one may be employed as illustrated in Figure 11. In utilizing a bellows of small diameter the same may be formed of one piece. The use of a small bellows is possible only in situations where the valve controlled thereby is of the pivoted substantially balanced type. Theoretically, the slight amount of overbalance, that is, the excess area on one side of the pivot 79, multiplied by the effective lever arm thereof and by the mechanical advantage of the lever 86 should approximately equal the area of one end of the bellows 94'. As explained above, the overbalance of the butterfly valve 78 is very slight, and hence a relatively small bellows suffices in a construction employing a pivoted butterfly valve and a thermal element in the form of a bellows. Figures 12 and 13 also illustrate the use of a bellows of relatively small inexpensive form.

Figures 12 and 13 illustrate a fluid filled bellows type of thermostatic device in which the bellows is arranged to exert a valve opening and closing force longitudinally of the surrounding casing. In the case of Figures 12 and 13 the same casing 10 comprising parts 11 and 12 are employed as in the modifications illustrated in Figures 2 and 5. The shell 15 and the pivoted butterfly valve 20 are also the same as is illustrated in Figures 2 and 5. In this case, however, the shell 15 supports a U-shaped strap or bracket 150 riveted or otherwise suitably secured to the shell, and a relatively small bellows 151 is supported by the somewhat enlarged intermediate portion 153 of the bracket 150. The bellows 151 in this case is arranged in a transverse plane and the base is secured in any desired manner, as by sweating, to the enlarged portion 153.

The movable end of the bellows 151 carries a suitable threaded cap 155 in which is received one end of an adjusting screw 157. The other end of the adjusting screw is provided with a head 158 which is provided with a threaded recess receiving the threaded end of an eye bolt 160 pivotally supported, as by a pivot pin 161 on a lever 163. The adjusting screw 157 and the associated parts are provided with right and left hand threads so that rotation of the adjusting screw 157 in one direction will increase the effective length of the connection between the bellows 151 and the lever 163 while rotation of the adjusting screw in the other direction will decrease the effective length of these parts.

The lever 163 is pivoted for movement about a fulcrum carried by the shell 15 and the strap 150. The fulcrum comprises a bracket 165 secured to the flange portion 16 of the shell 15 and provided with a reenforcing strut 166 riveted or otherwise secured to the bracket 150. The bracket 165 receives a pivot pin 168 by which the lever 163 is pivoted thereto. The other end of the lever 163 is pivoted to the link 36 so that expansion and contraction of the bellows 151 due to the action of the contained fluid under temperature changes will swing the lever 163 to open and close the valve 20.

As in the case of the construction illustrated in Figures 2 and 5, the valve 20 is formed of thin flexible stock and is shaped to provide a clearance opening 25 to permit of some circulation of the cooling medium past the valve 20 when the latter is closed under low pressure and to provide for flexing of the valve under pressure changes to overcome static friction. Preferably, the valve 20 is slightly overbalanced in favor of opening so that the pressure of the cooling medium when the valve is closed tends to open the same. This tendency is opposed, however, by virtue of the hydrostatic pressure on the bellows 151 which tends to contract the same and thus hold the valve closed as explained above in connection with Figures 8 and 11. This is also aided by the flow through the clearance opening 25.

When the cooling medium has reached a temperature in which the contained fluid expands with a force somewhat greater than the hydrostatic pressure the bellows, aided by the opening pressure on the valve 20, is then operative to controllably swing the valve 20 about its pivotal support 21 and thus control the flow of cooling medium to the system.

While we have shown and described the preferred constructional details in which the present invention is preferably embodied it will be apparent that our invention is not to be limited to the specific means shown and described but that widely different means may be employed in the practice of the broader aspects of our invention, as defined by the appended claims.

What we claim, therefore, and desire to secure by Letters Patent is:

1. A temperature responsive control system comprising a movable valve, a temperature responsive element having one end connected with the valve to move the same in response to temperature changes, yielding means fixing the other end of said element, and a shiftable abutment limiting the movement of said yielding means in one direction, said shiftable abutment being adjustable without disturbing the relation between said end of the temperature responsive element and the valve.

2. A temperature responsive control system comprising a casing adapted to conduct fluid flow, a shell disposed within said casing and provided with a pivoted valve for controlling the flow through said casing, spaced brackets secured to said shell, a temperature responsive coil having one end connected with said valve, a movable member pivotally carried by said brackets, the other end of said temperature responsive coil being fixed to said movable member, an arm fixedly secured to said movable member, and a manually operable screw carried by said casing and abutting against said arm for shifting the position of said movable member whereby to control the temperature at which said temperature responsive coil becomes active to shift said valve, said arm being movable away from engagement with the screw by the action of the temperature responsive means.

3. A temperature responsive control system comprising a casing adapted to conduct fluid flow therethrough, a shell disposed within said casing, a valve pivotally supported by said shell and adapted to control the flow of fluid through said casing, a temperature responsive element disposed within said casing on the upstream side of said valve and having one end link-connected with said valve to open and close the same, a movable member within said casing and to which the other end of said temperature responsive element is fixed, a threaded adjusting screw carried by said casing and accessible from without the casing, said adjusting screw cooperating with said movable member and serving as an adjustable abutment therefor to control the temperature at which said temperature responsive element becomes active, said movable member being movable away from said abutment, and yielding means urging said member towards said abutment with an effective force in excess of the reaction on the yielding means upon the initial actuation of the valve.

4. A temperature responsive device comprising a shell, a valve pivoted therein, brackets carried by the shell, a fluid filled bellows responsive to temperature changes, a lever fulcrumed near one end on one of said brackets and connected with the valve near the other end, means connecting the bellows with said lever near said one end, and an abutment carried by the other of said brackets and arranged to take the reaction of said bellows, said abutment being yieldable in one direction under excessive temperatures, and stop means cooperating with said other bracket limiting the movement of said abutment in the other direction to determine at what temperature the valve will be moved.

5. A temperature responsive control system comprising a casing adapted to conduct fluid flow therethrough, a shell disposed within said casing, a valve pivotally supported by said shell and adapted to control the flow of fluid through said casing, spaced brackets carried by said shell, a flat fluid filled expansible bellows arranged edgewise with respect to the flow through the casing, a lever fulcrumed on one of said brackets and connected with said valve at one end and at its other end with one end of the bellows, that end of said bellows being thereby supported by said lever from said one bracket, and means connecting the other end of the bellows with the other bracket.

6. In combination with a conduit for fluid flow, a flow controlling valve therein having limiting open and closed positions, thermal means for controlling the valve, said thermal means comprising a closed expansion bellows having fluid therein under vacuum at low operating temperatures and under pressure at high operating temperatures whereby the ends of the bellows are drawn towards one another to positively hold said valve in its closed position at the lower operating temperatures and pushed apart to open said valve at the higher operating temperatures, a stop towards which one end of the bellows is forced when the pull of the bellows is in a direction to close said valve and from which it is forced when the pull is in the opposite direction, and spring means urging said one end of the bellows towards said stop, said end of the bellows being movable away from the stop against the action of the spring means, at the higher temperatures.

7. In combination with a conduit for fluid flow, a flow controlling valve therein having limiting open and closed positions, thermal means for controlling the valve, said thermal means comprising a closed expansion bellows having fluid therein under vacuum at low operating temperatures and under pressure at high operating temperatures whereby the ends of the bellows are drawn towards one another to positively hold said valve in its closed position at the lower operating temperatures and pushed apart to open said valve at the higher operating temperatures, a stop towards which one end of the bellows is forced when the pull of the bellows is in a direction to close said valve and from which it is forced when the pull is in the opposite direction, spring means urging said one end of the bellows towards said stop, said end of the bellows being movable away from the stop against the action of the spring means, at the higher temperatures, and means for variably fixing the position of said stop to determine the temperature at which the bellows opens the valve.

8. A temperature responsive control system comprising a casing adapted to conduct fluid flow, a shell disposed within said casing and provided with a pivoted valve for controlling the flow through said casing, spaced brackets secured to said shell, a temperature responsive coil having one end connected with said valve, a movable member pivotally carried by said brackets, the other end of said temperature responsive coil being fixed to said movable member, means serving as an arm fixedly secured to said movable member, and a manually operable member supported in adjustably fixed relation with respect to said brackets and engageable with said arm means for shifting the position of said movable member whereby to control the temperature at which said temperature responsive coil becomes active to shift said valve.

9. A temperature responsive control system comprising a casing adapted to conduct fluid flow, a shell disposed within said casing and provided with a pivoted valve for controlling the flow through said casing, spaced brackets secured to said shell, a temperature responsive coil having one end connected with said valve, a movable member pivotally carried by said brackets, the other end of said temperature responsive coil being fixed to said movable member, means serving as an arm fixedly secured to said movable member, and a manually operable member supported in adjustably fixed relation with respect to said brackets and engageable with said arm means for limiting the movement of said arm means relative to said brackets in at least one direction, said member being adjustable for shifting the position of said movable member whereby to control the temperature at which said temperature responsive coil becomes active to shift said valve.

10. A temperature responsive control system comprising a casing adapted to conduct fluid flow, a shell disposed within said casing and provided with a pivoted valve for controlling the flow through said casing, spaced brackets secured to said shell, a temperature responsive coil having one end connected with said valve, a movable member pivotally carried by said brackets, the other end of said temperature responsive coil being fixed to said movable member, a spring member fixedly secured at one end to said movable member, and a manually operable member supported in adjustably fixed relation with respect to said brackets and engageable with the other end of said spring member, said manually operable member being adjustable relative to said brackets for shifting the position of said movable member whereby to control the temperature at which said temperature responsive coil becomes active to shift said valve.

11. A temperature responsive control system comprising a casing adapted to conduct fluid flow, a shell disposed within said casing and provided with a pivoted valve for controlling the flow through said casing, bracket means carried by said shell, the temperature responsive coil having one end connected with said valve, a member rotatably supported by said bracket means, the other end of said temperature responsive coil being fixedly connected with said rotatable member and being adjusted with respect to said bracket means by rotation of said member, and manually controlled means fixing said rotatable member against rotation, at least during normal operating temperautres, to control the temperature at which said temperature responsive coil becomes active to shift said valve.

PETER J. JORGENSEN.
CLARENCE H. JORGENSEN.